United States Patent [19]

Swis

[11] 4,285,233
[45] Aug. 25, 1981

[54] SYSTEM FOR HOT TESTING ENGINES

[75] Inventor: Philip E. Swis, Armada, Mich.

[73] Assignee: Sun Electric Corporation, Crystal Lake, Ill.

[21] Appl. No.: 82,313

[22] Filed: Oct. 5, 1979

[51] Int. Cl.³ .......................................... G01M 15/00
[52] U.S. Cl. ...................................... 73/116; 198/502
[58] Field of Search ............... 73/117.3, 116; 198/341, 198/502, 855

[56] References Cited

U.S. PATENT DOCUMENTS

| | | | |
|---|---|---|---|
| 2,334,991 | 11/1943 | Castiglia . | |
| 3,493,440 | 2/1970 | Ashdown | 148/6.15 |
| 3,527,087 | 9/1970 | Converse et al. | 73/117.3 |
| 3,538,759 | 11/1970 | Schrom | 73/116 |
| 3,616,686 | 11/1971 | Lash | 73/116 |
| 3,648,819 | 3/1972 | Converse et al. | 198/19 |
| 3,695,099 | 10/1972 | Viano | 73/117.3 |
| 3,697,865 | 10/1972 | Smith et al. | 73/118 X |

*Primary Examiner*—Jerry W. Myracle
*Attorney, Agent, or Firm*—Allegretti, Newitt, Witcoff & McAndrews, Ltd.

[57] ABSTRACT

A preferred embodiment of the system for hot testing automobile engines includes a hot test station and an indexing mechanism, or conveyor, for advancing engines to the hot test station. The engines are operated during advancement such that normalization is achieved prior to reaching the hot test station.

14 Claims, 5 Drawing Figures

SYSTEM FOR HOT TESTING ENGINES

BACKGROUND OF THE INVENTION

The present invention relates generally to a testing system and more particularly to a system for "hot testing" automobile engines.

"Hot testing" of an automobile engine is conducted under conditions that approximate normal operation. It therefore requires that the engine be run for a warm-up period sufficient to normalize the engine. The hot testing generally includes a power output, timing, oil pressure and vibration measurement. Hot testing may also include a check of exhaust emissions, exhaust temperature, noise and other aspects of engine performance.

In a typical hot test system, the engine is transported from the production line to the hot test stand. Water, electrical power and metering interconnections are made, and the engine is started and normalized. Finally the engine is tested.

All activity normally takes place while the engine is in the hot test station. The testing equipment itself is therefore idle for a substantial portion of the complete test cycle. In a typical hot test, the operating procedures and respective times are as follows:

| Procedure | Time (minutes) |
| --- | --- |
| Hook-up | 5 |
| Normalization | 10 |
| Hot testing | 1 |
| Release | 5 |

Thus the testing equipment is actually utilized only 5% of the total test time. The hot test equipment is idle for the remaining time while the engine is moved into the hot test unit, normalized and then released.

To test engines at a commercially viable rate consequently requires a substantial number of hot test stands. Since these stands are large and expensive, and since each must be coupled to the engine production line, the cost per engine hot test is substantial. Further, the complex nature of the system, i.e., several test stands and connections with the main engine production line, pose additional maintenance, safety and noise problems.

SUMMARY OF THE INVENTION

It is thus an object of the present invention to provide an improved, efficient hot test system. Another object is a system for hot testing automobile engines wherein the test equipment is utilized substantially continuously, whereby system efficiency is improved and system costs are decreased. Still another object is to reduce the space and equipment requirements of a hot test system.

It is also an object of the present invention to provide a hot test system including a dial indexing type conveyor for advancing engines to the test equipment. Yet another object is a hot test system including a indexing dial which advances or indexes at a substantially fixed rate, i.e., in steps with stationary dwell periods therebetween.

It is a further object of the present invention to provide a hot test system wherein various engine connections are automatically made when the engine enters the system. Another object is to improve the consistency of measurements in a hot test system by reducing the number of hot test stands and regulating the warm-up or normalization period.

In a principal aspect, the present invention, a system for hot testing engines, includes a dial index for advancing the engines under investigation to the hot test station. During the advancement sequence, the engines are operated such that normalization is accomplished prior to the engine reaching the hot test station. This results in substantially continuous operation and utilization of the hot test equipment and a regulated normalization time.

In another aspect, the present invention includes a pallet subsystem for mounting the engines on the dial index. The pallet subsystem and dial index automatically provide engine-supply interconnections (necessary to operate the engine) as the engine is loaded on the dial index.

These and other objects, features and advantages of the present invention are set forth or apparent in the following detailed description.

BRIEF DESCRIPTION OF THE DRAWING

A preferred embodiment of the present invention is shown, in detail, in the drawing wherein:

FIG. 4 illustrates perspectively a pallet of the embodiment shown in FIG. 1.

DETAILED DESCRIPTION OF THE PREFERRED EMBODIMENT

Figure 1:
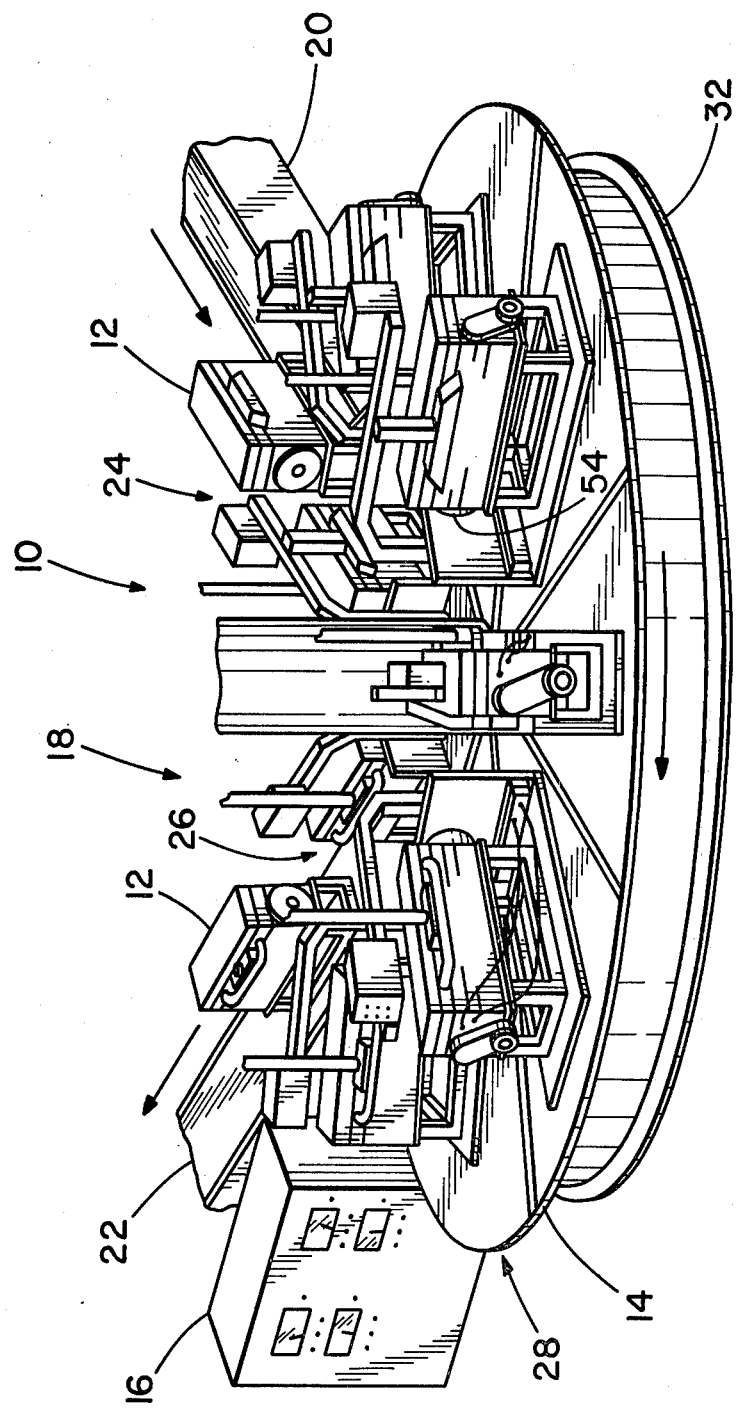
FIG. 1 illustrates perspectively a preferred embodiment of the present invention.

Referring to FIG. 1, a preferred embodiment of the present invention is shown as a system 10 for hot testing internal combustion engines 12 (shown schematically). The system 10 includes a dial index 14, a hot test apparatus 16 adjacent the dial index 14, and a subsystem 18 for loading and unloading the engines 12. As shown, the subsystem 18 includes a feed or loading conveyor 20 and a return or unloading conveyor 22, both terminating adjacent the dial index 14 and respectively defining a loading station 24 and an unloading station 26.

The dial index 14 is a substantially annular conveyor. Movement of the dial index 14 advances or indexes each engine 12 towards the hot test apparatus 16. In this preferred embodiment, the dial index 14 is indexed seven times per revolution, thereby defining seven predetermined and substantially equal dwell or stationary periods and a predetermined indexing rate.

Each engine 12 is hot tested during one dwell period when the engine 12 is substantially adjacent the hot test apparatus 16, i.e., at the hot test station 28. One engine 12 is also loaded on and unloaded from the dial index 14 during each dwell period.

Figure 2:
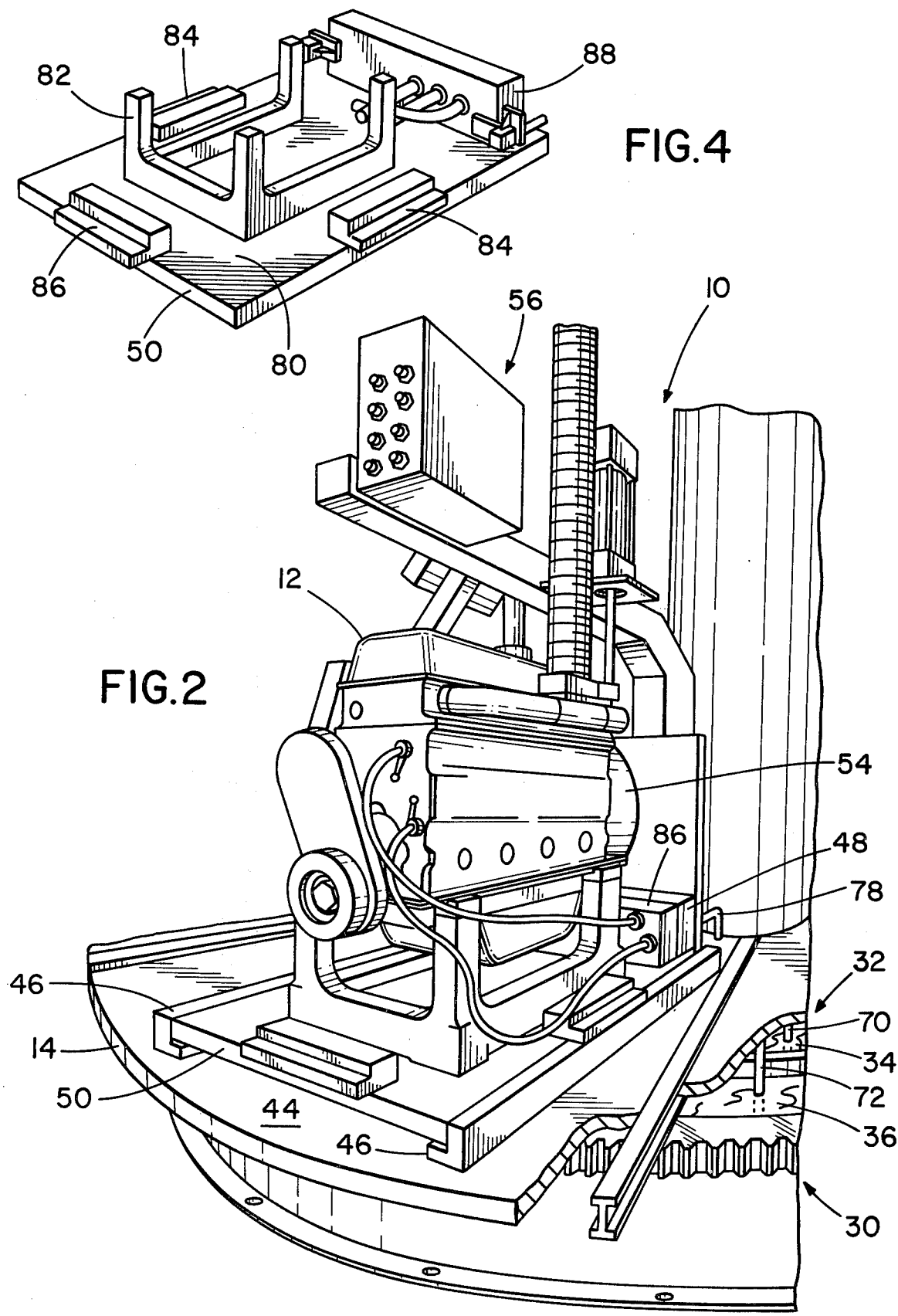
FIG. 2 illustrates perspectively and schematically an engine station of the embodiment shown in FIG. 1.

Referring to FIGS. 1 and 2, the dial index 14 is rotated about a central axis by a motor-gear mechanism, shown schematically at 30. The motor-gear mechanism 30 is adjustable such that the total cycle time, stationary dwell time and indexing rate are variable. Preferably, the motor-gear mechanism 30 includes a hydraulic motor and heavy duty ring gear bearings (not shown) to provide a long life.

The cycle time, i.e., the time per complete revolution of the dial index 14, is determined primarily by the time necessary to normalize the engine 12. Data gathering and analysis by the hot test apparatus 16 is generally accomplished in a short period of time, e.g., five to thirty seconds. Normalization times, on the other hand, range from two minutes to an hour. The indexing rate is selected to complete normalization of each engine 12 as the engine 12 is indexed into the hot test station 28.

The dial index 14 is secure and rotates above a substantially cylindrical base 32. The base 32 includes or defines two substantially annular water troughs 34, 36. The troughs 34, 36 are interconnected, as shown schematically in FIG. 5, by piping 38, a pump 40 and heat exchanger 42. The heat exchanger 42 withdraws heat from the water as it is transferred between troughs 34, 36 by the pump 40, to maintain a source of cool water for engine operation.

Figure 3:
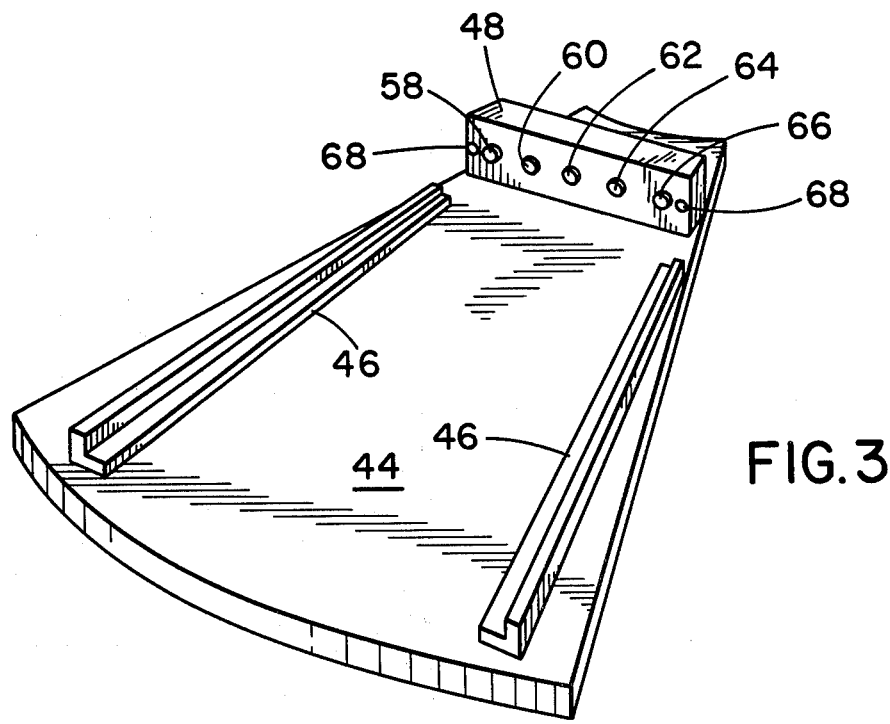
FIG. 3 illustrates perspectively a pallet-receiving station of the embodiment shown in FIG. 1.

Referring now to FIGS. 1-3, the dial index 14 includes a series of seven pallet-receiving stations 44 thereon. (The number of indexing steps and pallet-receiving stations 44 are preferably equal.) Each station 44 is defined by a pair of tracks 46 and a pallet stop plate 48, substantially adjacent the inner circumferential edge of the dial index 14.

The engine 12 is transported on a pallet 50 to the dial index 14 by the loading conveyor 20. The pallet 50, best shown in FIG. 4, is adapted to slidably enter the pallet-receiving station 44, engage the tracks 46, and abut the pallet stop plate 48.

Each pallet-receiving station 44 also includes a mechanism, generally designated 52, for securing the engine 12 and pallet 50 on the dial index 14, an engine starter 54, and a sequencer control, generally designated 56. As shown in FIGS. 1 and 2, the engine 12 and engine starter 54 engage with loading of the pallet 50 on the dial index 14. The engine 12 is started within seconds after loading and prior to the first advancement of the dial index 14. In this preferred embodiment, the securing mechanism 52 is a twist-and-clamp hydraulic cylinder adapted to lockingly engage the pallet 50.

The sequencer control 56 is automatically interconnected to the engine 12 after loading. Throughout the test cycle, i.e., start-up, normalization and testing, the sequencer control 56 monitors engine operation, such as temperature, oil pressure and vibration. If an unsafe condition is sensed, operation of the engine 12 is immediately terminated by the sequencer control 56.

The sequencer control 56 is commercially available. Once such sequencer control 56 is marketed by the Allen-Bradley Corporation, Milwaukee, Wisconsin. The sequencer control 56 itself provides various engine connections necessary for operation of the engine 12, such as a manifold.

Figure 5:
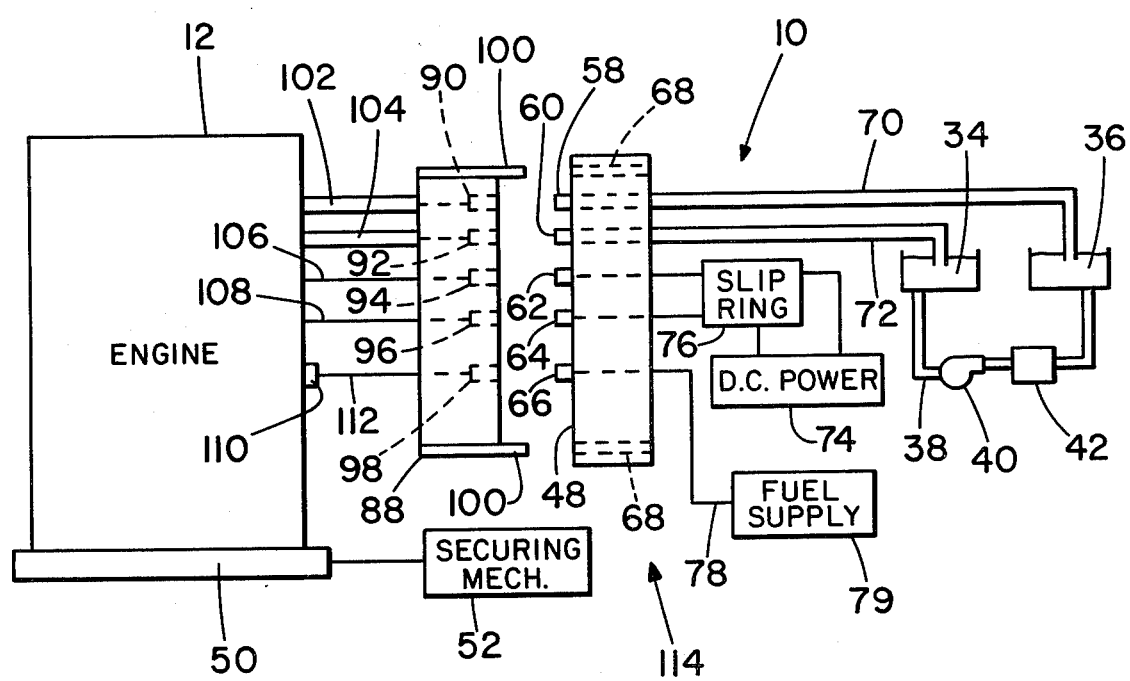
FIG. 5 illustrates schematically various features of the embodiment shown in FIG. 1.

As best shown in FIGS. 3-5, the pallet stop plate 48 includes a series of male connectors 58, 60, 62, 64 and 66, extending towards the tracks 46, and a pair of guide openings 68. The connectors 58, 60 are connected, respectively, by pipes 70, 72 to the water troughs 34, 36 within the base 32. The male connectors 62, 64 are electrically coupled to a central D.C. power supply 74 via a slip ring assembly 76. The connector 66 is connected by a supply line 78 to a fuel supply 79.

The pallet 50 includes a base 80 adapted for receipt by the tracks 46, an engine mount or support 82 centrally secured to the base 80, a pair of side flanges 84, and a rear flange 86. As shown, the side flanges 84 are secured to the top surface of the base 80 and extend beyond the sides thereof. The side flanges 84 are adapted to engage the top surface of the tracks 46 to facilitate securing the pallet 50 to the dial index 14.

The pallet 50 further includes an interface block 88 adapted to engage and mate with the pallet stop plate 48 of the pallet-receiving station 44. Referring to FIG. 5, the interface block 88 includes a series of female connectors or receptacles 90, 92, 94, 96 and 98 (shown in phantom), adapted to interlockingly receive the male connectors 58, 60, 62, 64 and 66, respectively, of the pallet stop plate 48. The interface block 88 also includes a pair of guide rods 100 adapted to engage the guide openings 68 to further align the pallet 50 on the dial index 14.

The female connectors 90, 92 are connectable to the engine 12, and more particularly to a water inlet and outlet thereof, by hoses 102, 104. The connectors 94, 96 are couplable to the electrical terminals of the engine 12 by wire leads 106, 108. The connector 98 is connected to the carburetor 110 of the engine 12 by a gas line 112.

As the pallet 50 and engine 12 enter the loading station 24, the twist-and-clamp hydraulic cylinder 52 engages and interlocks with the pallet 50. The cylinder 52 then retracts, drawing the pallet 50 and engine 12 into the pallet receiving station 44 of the dial index 14.

With loading, the pallet stop plate 48 and interface block 88 mate and engine 12 is supplied with water, electrical power and fuel. As such, the dial index 14 and the pallet 50 cooperatively define operating means, generally designated 114, for operatively activating the engine 12, such that the engine 12 can be started by the engine starter 54 and normalized.

In this preferred embodiment, water, electrical and fuel connections are accomplished by the operating means 114. It is to be understood, however, that the operating means 114, as shown, is merely illustrative and the connections accomplished thereby will vary in accordance with the type of engine 12 and the hot test to be performed.

As the index dial 14 advances an engine 12 to the hot test station 28, the operator interconnects the hot test apparatus 16 and the engine 12. Once connected, the hot test apparatus 16 gathers and analyzes the operational data and displays the test results. The connections are then released prior to advancement of the engine 12 to the unloading station 26.

Since the hot test apparatus 16 does not interface with the engine 12 until normalization is achieved, the hot test apparatus 16 is utilized to gather and analyze data on a substantially continuous basis. That is, the hot test apparatus 16 is not idle during the normalization period.

This continuous utilization substantially increases the efficiency of the system 10 by reducing (1) the number of hot test apparatus 16 necessary to test engines 12 under mass production conditions, (2) the equipment necessary to interconnect the hot test apparatus and the engine production line, and (3) the time per test. Assuming a total test cycle time of five minutes (seven dwell periods of approximately thirty-seven seconds and seven indexes requiring approximately six seconds each) and a required normalization period of four minutes, the system 10 will provide a tested engine every forty-three seconds, once stable operation is achieved. This is to be contrasted with an approximate rate of one engine every five minutes when the hot test apparatus 16 is occupied during hook-up, normalization, test and release as in conventional hot test systems.

In addition, the normalization period is regulated by the predetermined indexing rate. Data is therefore more consistent and the engine test is more accurate. Further variations due to numerous hot test apparatus are substantially avoided.

A single preferred embodiment of the present invention has been described. However, the true scope and spirit of the present invention are defined by the following claims, to be interpreted in light of the foregoing specification.

What is claimed is:

1. A system for testing an engine comprising, in combination:
   test means for testing said engine;
   pallet means for supporting said engine; and
   a dial index adapted to receive said pallet means at a loading station and adapted to discharge said pallet means at an unloading station, said dial index advancing said engine from said loading station to said test means and then to said unloading station at a predetermined index rate, said predetermined index rate being defined by a series of indexes by said dial index and a series of predetermined stationary periods between each of said indexes, whereby said engine is normalized upon arrival at said test means.

2. A system as claimed in claim 1 wherein said pallet means and said dial index cooperatively define operating means for operatively activating said engine.

3. A system as claimed in claim 2 wherein said operating means supplies water, electrical power and fuel to said engine.

4. A system as claimed in claim 1 or 2 wherein said predetermined index rate is variable.

5. A system as claimed in claim 1 wherein said dial index is rotatable about a base, said base defining a pair of water troughs.

6. A system as claimed in claim 1 or 5 wherein said dial index defines a series of pallet-receiving stations, each of said pallet-receiving stations including a pallet stop plate adapted to matingly engage with said pallet means.

7. A system as claimed in claim 6 wherein said pallet support plate is interconnected to said pair of water troughs.

8. A system as claimed in claim 6 further comprising a D.C. power supply, said dial index including interconnect means for connecting each of said pallet stop plates to said D.C. power supply and for maintaining the connection therebetween during advancement of said engine by said dial index.

9. A system as claimed in claim 5 further comprising means for cooling the water within said pair of water troughs.

10. A system as claimed in claim 1 or 2 wherein said dial index further includes starter means for engaging and starting said engine as said dial index receives said pallet means.

11. A system as claimed in claims 1 or 2 further comprising a sequence control, said sequence control operating and monitoring said engine during normalization and testing.

12. A system for testing an engine comprising, in combination:
    test means for testing said engine;
    pallet means for supporting said engine; and
    a dial index adapted to receive said pallet means at a loading station and adapted to discharge said pallet means at an unloading station, said dial index advancing said engine from said loading station to said test means and then to said unloading station at a predetermined index rate, whereby said engine is normalized upon arrival at said test means;
    said dial index defining a series of pallet-receiving stations, each of said pallet-receiving stations including a pallet stop plate adapted to matingly engage with said pallet means.

13. A system as claimed in claim 12 wherein said predetermined index rate is defined by a series of indexes by said dial index and a series of predetermined stationary periods between each of said indexes.

14. A system as claimed in claim 13 wherein said pallet means and said dial index cooperatively define operating means for operatively activating said engine.

* * * * *